May 21, 1968 H. ZIEMS ET AL 3,384,446
APPARATUS FOR DISINFECTING GASES
Filed Feb. 24, 1964
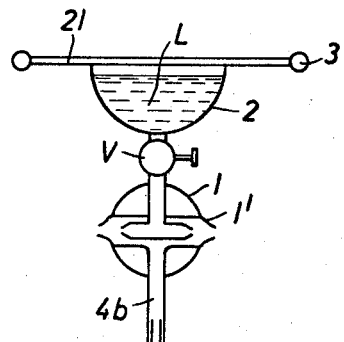
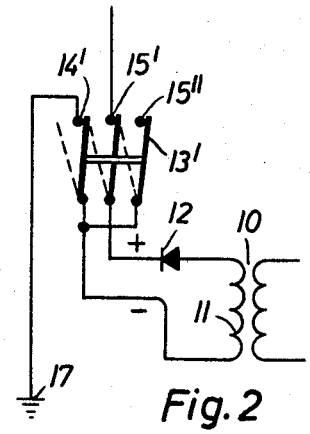
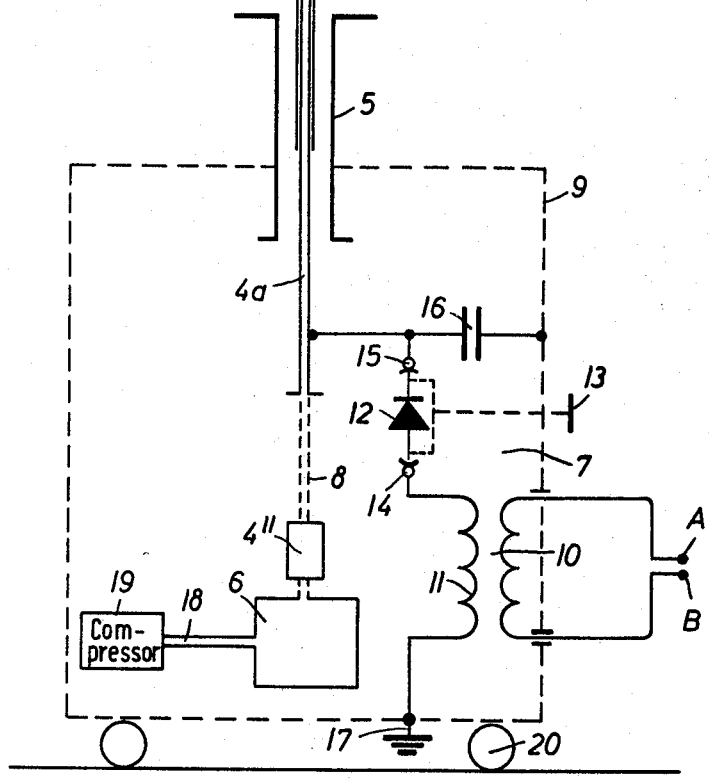
INVENTORS
Helmut Ziems
Rudolf Bönicke
BY Michael J. Striker
Atty

United States Patent Office 3,384,446
Patented May 21, 1968

3,384,446
APPARATUS FOR DISINFECTING GASES
Helmut Ziems, Cologne, and Rudolf Bönicke, Borstel uber Bad Oldesloe, Germany, assignors to Elektro-Aerosol Ziems & Co., Cologne, Germany
Filed Feb. 24, 1964, Ser. No. 346,659
9 Claims. (Cl. 21—74)

ABSTRACT OF THE DISCLOSURE

An arrangement for removing suspended particles within a gaseous medium and applying thereto disinfecting effects. The arrangement is especially applicable to purifying and sterilizing air. A disinfecting fluid is atomized into a fine spray by means of a compressor and spray nozzles. A high voltage D.C. supply applies a high potential to the atomized spray so that the particles within the spray are charged to a high potential. As as result of the charged atomized spray, any particles within the air such as dust, are attracted to the atomized spray. Once such dust particles come into contact with the atomized spray, any microorganisms adhering to the dust particles are rendered ineffective due to the disinfecting properties of the spray. With the removal of the spray and hence the dust particles attracted to the spray, the air within a particular confined space is purified.

---

The present invention concerns a method and an apparatus for sterilizing a given amount of a gaseous medium, particularly air contained in a room, and for removing therefrom simultaneously any suspended solid particles, e.g. dust.

As is well known, viruses or bacteria are frequently carried by dust or other solid particles suspended in the air and are thus transported from place to place. The viruses themselves have a comparatively very high specific gravity so that in the absence of suspended particles carrying them they would sink down and settle on the floor or on the ground, from where they might be stirred up again together with dust and thus return to the air of the particular room. Consequently, if air contaminated with viruses or bacteria is to be sterilized it is of utmost importance that the dust or other suspended particles contained in that air are removed as best as possible.

Previous attempts to devise a method or apparatus for sterilizing and cleaning a gaseous medium like air in this manner and for said purpose have not proven satisfactory. Filtering of gases or electrostatic dust removal from a gas has not led to a success because the process is an entirely dry process. There is no sterilizing effect. The same applies also to the method of spraying water into the gas to be cleaned because again no sterilizing effect takes place.

It is therefore one object of this invention to provide for a method which in a simple manner produces simultaneously a sterilization of a given amount of a gaseous medium and a removal therefrom of suspended solid particles.

It is another object of this invention to provide for an apparatus by means of which a gaseous medium can be sterilized and simultaneously freed of suspended articles.

It is still another object of this invention to provide for an apparatus which is comparatively very simple in its structure and entirely reliable in operation.

With above objects in view the invention includes a method of simultaneously sterilizing a given amount of a gaseous medium and of removing therefrom suspended solid particles, comprising the steps of: introducing into said gaseous medium a liquid in atomized form so as to constitute a fine dispersion of minute droplets capable of floating and then settling down, said liquid consisting at least partly of a disinfectant substance; and simultaneously charging said droplets electrostatically with one predetermined polarity.

In another aspect this invention also includes an apparatus for introducing into a gaseous medium to be sterilized and cleaned an at least partly disinfectant liquid in the form of a fine dispersion of electrostatically charged droplets, comprising, in combination, source means for furnishing a high direct current voltage; a first and a second electrode means connected with said source means for carrying potentials of opposite polarities corresponding to said high direct current voltage, said first and second electrode means being located spaced from each other in the area occupied by said gaseous medium to be sterilized and cleaned, one of said electrode means including spray means for dispersing said liquid into said medium in atomized form so as to constitute a fine dispersion of minute droplets; supply means for supplying said liquid to said spray means; and pressure means for placing said liquid under pressure while it is supplied to said spray means, so that said liquid is sprayed into said gaseous medium as a fine dispersion of minute droplets, the latter being charged electrostatically so as to attract suspended particles, to cause them to settle down toward the second electrode means and simultaneously to disinfect said particles.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 1 is a diagrammatic illustration of one embodiment of the invention; and

FIG. 2 is a diagram illustrating an alternative detail of the arrangement according to FIG. 1.

The method according to the invention mainly comprises the steps of introducing into a gaseous medium a liquid in atomized form so as to constitute a fine dispersion of minute droplets capable of floating and then settling down, the liquid consisting at least partly of a disinfectant substance, while simultaneously these droplets are charged electrostatically with one predetermined polarity.

The result of this method is that the electrically charged droplets attract any suspended particles contained in the gaseous medium, including dust and also viruses or bacteria which may be carried by the dust or otherwise be floating in the air. As the suspended particles are joined with the charged droplets immediately a sterilizing effect takes place in view of the disinfectant substance contained in the droplets of said liquid. At the same time the charged and loaded droplets start to settle down toward the ground, particularly assisted in this settling movement by the fact that an area or electrode of opposite polarity to that of the charge of the droplets tends to attract the charged droplets. Consequently, after a given time of operation the gaseous medium or air in a room will be entirely cleaned and sterilized, the dust particles, now also sterilized, will have accumulated on the floor from where they can be now removed with other conventional means.

Various types of apparatus may be used for carrying out the above method. However, a particularly well suited apparatus will be described here below in reference to the drawing which at the same time illustrates an apparatus according to the invention.

The apparatus according to FIG. 1 comprises a housing indicated diagrammatically at 9 and preferably supported on wheels or casters 20 so that the entire apparatus can be wheeled around a room or building in order to sterilize the air in the room or in other rooms as may be desired. Arranged within the housing is a supply or source of high direct current voltage 7. Since a comparatively very high direct current voltage is required for the intended purpose a transformer 10 is provided the primary winding whereof is connected in some conventional manner with terminals A and B through which for instance ordinary line voltage may be supplied to the primary coil of the transformer 10. The secondary coil 11 of the transformer 10 is designed to step up the input voltage to an output voltage in the order of 20,000 volts. Experiments have shown that in ordinary cases the voltage should not be below 18,000 volts. One end of the secondary winding 11 is taken to an output terminal 17 which constitutes one electrode of the arrangement and may be extended in any suitable manner so as to constitute a large size counter-electrode of the arrangement relative to the other electrode described further below. In many cases it might be sufficient to connect the terminal 17 with ground so that in the area around the apparatus the ground will have the potential of the terminal 17. The opposite end of the secondary coil 11 of the transformer 10 is taken through a rectifier arrangement 12-15 to the above-mentioned other electrode of the arrangement which in this example comprises a two-part tubular member 4. This tubular member 4 is made up of an inner tube 4a and an outer tube 4b which is telescopically movable along the inner tube 4a so that the length of the electrode member 4 is adjustable. Whenever a desired adjustment is made the outer tube 4b may be locked relative to the inner tube 4a by a locking screw 4' or the like. The tubular electrode member 4 is supported by the housing 9 with the aid of suitable conventional holding means diagrammatically shown at 5.

The upper end of the tube member 4b carries a spray device 1 preferably including a plurality of individual nozzles 1'. Above the spray device 1 a reservoir 2 is arranged which is adapted to contain a certain amount of a liquid L of the type above-described and intended to be used in the manner set forth above. A valve is interposed between the reservoir 2 and the spray device 1 so that when the valve V is opened liquid L can reach simply by gravity the spray device 1.

Since a comparatively high direct current voltage is applied to the tubular electrode 4 it is understood that the supporting means 5 include a suitable insulation between the electrode member 4 and the housing 9. The housing 9 is advantageously connected to ground at the terminal 17. Consequently a smoothing capacitor 16 may be connected between the rectifier output terminal 15 and the grounded housing 9 for smoothing out the rectified current in a well-known manner.

It will be understood that when the electric energy input at A, B is switched on the electrode 4 will carry the desired high potential against the opposite electrode 17 or ground so that droplets of the liquid L injected into the surrounding air will be electrostatically charged. The charging effect can be enhanced if the reservoir 2 is also made of conductive material and carries a lid 21 which is also conductive and is provided at its circumference with an annular charging electrode ring 3 which in this manner surrounds the entire area of the free end of the electrode 4.

The lower end of the tube member 4a communicates with a tank or the like 6 which is provided for containing compressed air supplied through the tube 18 by a compressor 19. The compressor 19 may be also contained in the housing 9 or may be located at some other suitable place and only connected by a preferably flexible tube or hose 18 with the container 6. Also the tank 6 may be located outside the housing 9 in which case the tank 6 would be connected by a flexible tube or hose with the lower end of the tube 4a.

In operation, when the supply of compressed air is available and the valve V is opened, liquid from the reservoir 2 will enter the spraying device 1 from above and will be met there by a flow of compressed air coming from the tank 6. Consequently the liquid L will be ejected under the action of the compressed air through the nozzles 1' into the surrounding air, the nozzles being constructed in well known manner so as to cause atomization of the liquid and formation of a fine dispersion of minute droplets. In view of the desired object of the operation of the device it is advisable to provide for a dry or other filter device 4'' arranged between the tank 6 and the tubular member 4 so that introduction of additional dust or other particles with the compressed air into the spraying device 1 is safely avoided.

There are cases where it is desirable to have the droplets charged with positive potential against a negative potential of the ground, and in other cases it may be desirable to reverse the polarity of these opposed potentials. Therefore, in the arrangement according to FIG. 1 the rectifier 12 is arranged in such a manner that by operation of a handle 13 it may be revolved about itself so that, in one position, the input terminal of the rectifier 12 will be located at the point 14 and its output terminal at the point 15, while in another position this arrangement is reversed.

A suitable type of rectifier for handling the comparatively high voltage is well known to the art. Experiments with a rectifier composed of a series of selenium tablets have proven satisfactory.

Instead of using a rectifier which is rotatable about itself as just described, an arrangement according to FIG. 2 may be used. It can be seen that in this case a reversing switch 13′ is interposed between the source of high direct current voltage and the electrodes. The reversing switch 13′ has three contact arms movable between a first and a second position. In the position illustrated in full lines the positive output terminal of the rectifier 12 is connected via terminal 15′ with the tube member 4 while the negative terminal of the coil 11 is connected via terminal 14′ with the grounded terminal 17. If the switch 13′ would be moved to its second position indicated in dotted lines the polarity of the potential applied to the tube 4 and to ground 17 would be reversed.

It should not be overlooked that in view of the conductivity of the tube member 4*a* either its lower portion or at least the connection from the tank 6 to the outside must also be insulated.

If the arrangement and method according to the invention is used for instance in a hospital then it is of particular advantage to have the housing movable on wheels because under these circumstances the arrangement, while being in operation, may be moved throughout a certain area or through an operating room until it can be fairly assumed that the air in the respective area or in the respective room has been entirely sterilized to the desired degree.

It should be understood that the liquid to be used may be composed entirely only of a concentrated disinfectant fluid. But it may as well consist of ordinary water taken from the general water supply, or of distilled water if available, or of mineral spring water because certain beneficial effects of such mineral spring water may be gained additionally to the sterilization effect. As far as the purpose of the invention is concerned practically any commercially available disinfectant substance may be used, for instance formaldehyde HCHO e.g. in a concentration of 1/100 parts i.e. 10 grams per one liter of distilled water.

It has been found that very satisfactory effects are obtained if comparatively small amounts of the disinfectant are in this manner introduced into the air. For instance, it can be said that generally the dispersion of 100 to 200 cubic centimeters of the disinfectant per hour is sufficient. While it has been stated above that it is generally desirable to provide for a housing 9 containing most of the components of the arrangement and being movable on wheels, it should not be overlooked that the method and arrangement according to the invention could also be modified in special cases. For instance, the arrangement could be installed stationarily and the air to be sterilized could be caused to flow past the work area of the arrangement. Usually, in such a case the arrangement would be installed within a duct or channel which carries the air to be sterilized.

In other cases it may be desirable to install the arrangement according to the invention in the area of openings of a room e.g. the windows and/or the doors. In such a case the arrangement may be such that the air which enters the particular room through a window or a door is guided by guide means in such a manner that within the area of the window or door it is forced to travel along a comparatively long path, and that during this travel along said path the air is mixed with electrostatically charged droplets of a liquid which consists partly of a disinfectant. For instance, if an operating room has a double casement window, each having three movable sashes, then for instance the center sash of the outer window may be opened, while the two lateral sashes of the inner casement window are opened. In such case guide devices may be arranged within the window arrangement so that the air entering from the outside has to travel a long path between the outer and inner casement windows. Then an arrangement according to the invention can be installed within the window structure so that when the arrangement is operated as described above only sterilized air will enter the operating room from the outside.

No need to say that the arrangement according to the invention can be built in large size units as well as in comparatively small size units depending upon local requirements. Likewise, the method according to the invention may be utilized in the above described manner both when large amounts of air or gas have to be sterilized, or when only small amounts are involved.

It may be added that experiments have shown that in carrying out the method or in operating the arrangement according to the invention excellent results are obtainable if the size of the droplets furnished by the spraying device ranges between about .6 to 1.1 microns. It has been found that it is very easy to provide the size by using conventional spray nozzles. About 80% of the droplets produced in this manner have a diameter of about .6 microns. Moreover, it has been found that if the diameter of the droplet is about 1 micron and if the electrical potential between the electrodes is about 40,000 volts, the droplets sink down at a rate of about 1 centimeter per second. On this basis, it is possible to estimate the duration of operation of the method or apparatus according to the invention in order to suit existing conditions.

It will be understood that each of the elements described above or two or more together, may also find a useful application in other types of method and apparatus for sterilizing and cleaning a gaseous medium differing from the types described above.

While the invention has been illustrated and described as embodied in a method and apparatus for sterilizing and cleaning a gaseous medium by means of a dispersion of electrostatically charged droplets of a liquid consisting at least partly of a disinfectant, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. Apparatus for introducing into a gaseous medium to be sterilized and cleaned a disinfectant liquid in the form of a fine dispersion of electrostatically charged droplets, comprising, in combination, source means for furnishing a high direct current voltage; a first and a second electrode means connected with said source means for carrying potentials of opposite polarities corresponding to said high direct current voltage, said first and second electrode means being located spaced from each other in the area occupied by said gaseous medium to be sterilized and cleaned, one of said electrode means including spray means for dispersing said liquid into said medium in atomized form so as to constitute a fine dispersion of minute droplets said one electrode means including a tubular member having an inner tube and an outer tube telescopically movable with respect to each other, said tubular member being supported at one end and carrying said spray means near its other end; supply means for supplying said liquid to said spray means; and pressure means for placing said liquid under pressure while it is supplied to said spray means, so that said liquid is sprayed into said gaseous medium as a fine dispersion of minute droplets, the latter being charged electrostatically so as to attract suspended particles, to cause them to settle down toward the second electrode means and simultaneously to disinfect said particles, whereby microorganisms adhering to said particles are rendered ineffective.

2. Apparatus for introducing into a gaseous medium to be sterilized and cleaned an at least partly disinfectant liquid in the form of a fine dispersion of electrostatically charged droplets, comprising, in combination, source means for furnishing a high direct current voltage; housing means surrounding at least part of said source means; a first and a second electrode means connected with said source means for carrying potentials of opposite polarities corresponding to said high direct current voltage, said first and second electrode means being located spaced from each other in the area occupied by said gaseous medium to be sterilized and cleaned, one of said electrode means including spray means for dispersing said liquid into said medium in atomized form so as to constitute a fine dispersion of minute droplets, said one electrode means including a tubular member having an inner tube and an outer tube telescopically movable with respect to each other, said tubular member being supported at one end by said housing means and carrying said spray means near its other end; supply means for supplying said liquid to said spray means; and pressure means for placing said liquid under pressure while it is supplied to said spray means, said pressure means being at least partly arranged in said housing means and communicating with said tubular member for carrying compressed air to said spray means, so that said liquid is sprayed into said gaseous medium as a fine dispersion of minute droplets, the latter being charged electrostatically so as to attract suspended particles, to cause them to settle down toward the second electrode means and simultaneously to disinfect said particles, whereby microorganisms adhering to said particles are rendered ineffective.

3. Apparatus for introducing into a gaseous medium to be sterilized and cleaned an at least partly disinfectant liquid in the form of a fine dispersion of electrostatically charged droplets, comprising, in combination, source means for furnishing a high direct current voltage; housing means surrounding at least part of said source means; a first and a second electrode means connected with said source means for carrying potentials of opposite polarities corresponding to said high direct current voltage, said first and second electrode means being located spaced from each other in the area occupied by said gaseous medium to be sterilized and cleaned, said first electrode means being connected to ground so as to apply said potential at one of said polarities thereto so that ground constitutes part of said first electrode means, the other one of said electrode means including spray means for dispersing said liquid into said medium in atomized form so as to constitute a fine dispersion of minute droplets, said other one of said electrode means including a tubular member having an inner tube and an outer tube telescopically movable with respect to each other, said tubular member being supported at one end by said housing means and carrying said spray means near its other end; supply means for supplying said liquid to said spray means; and pressure means for placing said liquid under pressure while it is supplied to said spray means, said pressure means being at least partly arranged in said housing means and communicating with said tubular member for carrying compressed air to said spray means, so that said liquid is sprayed into said gaseous medium so as fine dispersion of minute droplets, the latter being charged electrostatically so as to attract suspended particles, to cause them to settle down toward the second electrode means and simultaneously to disinfect said particles.

4. Apparatus for introducing into a gaseous medium to be sterilized and cleaned an at least partly disinfectant liquid in the form of a fine dispersion of electrostatically charged droplets, comprising, in combination, source means for furnishing a high direct current voltage; housing means surrounding at least part of said source means; a first and a second electrode means connected with said source means for carrying potentials of opposite polarities corresponding to said high direct current voltage, said first and second electrode means being located spaced from each other in the area occupied by said gaseous medium to be sterilized and cleaned, one of said electrode means including spray means for dispersing said liquid into said medium in atomized form so as to constitute a fine dispersion of minute droplets, said one electrode means including a tubular member supported at one end by said housing means and carrying said spray means near its other end; supply means for supplying said liquid to said spray means; reservoir means for said supply means; a tube member coaxial with said tubular member and supporting at one end said reservoir; a conductive cover covering said reservoir; an annular electrode connected to said cover and surrounding it, the outlet from said tube member supporting said reservoir and the outlet from said tubular member of said one electrode meeting in said spray means at a position along their common axis; and pressure means for placing said liquid under pressure while it is supplied to said spray means, said pressure means being at least partly arranged in said housing means and communicating with said tubular member for carrying compressed air to said spray means, so that said liquid is sprayed into said gaseous medium as a fine dispersion of minute droplets, the latter being charged electrostatically so as to attract suspended particles, to cause them to settle down toward the second electrode means and simultaneously to disinfect said particles.

5. Apparatus for introducing into a gaseous medium to be sterilized and cleaned an at least partly disinfectant liquid in the form of a fine dispersion of electrostatically charged droplets, comprising, in combination, source means for furnishing a high direct current voltage; housing means surrounding at least part of said source means; a first and a second electrode means connected with said source means for carrying potentials of opposite polarities corresponding to said high direct current voltage, said first and second electrode means being located spaced from each other in the area occupied by said gaseous medium to be sterilized and cleaned, one of said electrode means including spray means for dispersing said liquid into said medium in atomized form so as to constitute a fine dispersion of minute droplets, said one electrode means including a tubular member having an inner tube and an outer tube telescopically movable with respect to each other, said tubular member being supported at one end by said housing means and carrying said spray means near its other end; supply means for supplying said liquid to said spray means; and pressure means for placing said liquid under pressure while it is supplied to said spray means said pressure means being at least partly arranged in said housing means and communicating with said tubular member for carrying compressed air to said spray means, so that said liquid is sprayed into said gaseous medium as a fine dispersion of minute droplets, the latter being charged electrostatically so as to attract suspended particles, to cause them to settle down toward the second electrode means and simultaneously to disinfect said particles, whereby microorganisms adhering to said particles are rendered ineffective.

6. Apparatus for introducing into a gaseous medium to be sterilized and cleaned an at least partly disinfectant liquid in the form of a fine dispersion of electrostatically charged droplets, comprising, in combination, source means for furnishing a high direct current voltage; housing means surrounding at least part of said source means; a first and a second electrode means connected with said source means for carrying potentials of opposite polarities corresponding to said high direct current voltage, said first and second electrode means being located spaced from each other in the area occupied by said gaseous medium to be sterilized and cleaned, one of said electrode means including spray means for dispersing said liquid into said medium in atomized form so as to constitute a fine dispersion of minute droplets, said one electrode means including a tubular member supported at one end by said housing means and carrying said spray means near its other end and an annular electrode member substantially surrounding the area of said other end; supply means for supplying said liquid to said spray means; and pressure means for placing said liquid under pressure while it is supplied to said spray means said pressure means being at least partly arranged in said housing means and communicating with said tubular member for carrying compressed air to said spray means, so that said liquid is sprayed into said gaseous medium as a fine dispersion of minute droplets, the latter being charged electrostatically so as to attract suspended particles, to cause them to settle down toward the second electrode means and simultaneously to disinfect said particles, whereby microorganisms adhering to said particles are rendered ineffective.

7. Apparatus for introducing into a gaseous medium to be sterilized and cleaned an at least partly disinfectant liquid in the form of a fine dispersion of electrostatically charged droplets, comprising, in combination, source means for furnishing a high direct current voltage; housing means surrounding at least part of said source means; a first and a second electrode means connected with said source means for carrying potentials of opposite polarities corresponding to said high direct current voltage, said first and second electrode means being located spaced from each other in the area occupied by said gaseous medium to be sterilized and cleaned, one of said electrode means including spray means for dispersing said liquid into said medium in atomized form so as to constitute a fine dispersion of minute droplets, said one electrode means including a tubular member having an inner tube and an outer tube telescopically movable with respect to each other, said tubular member being supported at one end by said housing means and carrying said spray means near its other end; supply means for supplying said liquid to said spray means; and pressure means for placing said liquid under pressure while it is supplied to said spray means said pressure means being at least partly arranged in said housing means and communicating with said tubular member for carrying compressed air to said spray means, air filter means being arranged between said pressure means and said spray means for cleaning said compressed air supplied thereto, so that said liquid is sprayed into said gaseous medium as a fine dispersion of minute droplets, the latter being charged electrostatically so as to attract suspended particles, to cause them to settle down toward the second electrode means and simultaneously to disinfect said particles, whereby microorganisms adhering to said particles are rendered ineffective.

8. Apparatus for introducing into a gaseous medium to be sterilized and cleaned an at least partly disinfectant liquid in the form of a fine dispersion of electrostatically charged droplets, comprising, in combination, source means for furnishing a high direct current voltage; housing means surrounding at least part of said source means; a first and a second electrode means connected with said source means for carrying potentials of opposite polarities corresponding to said high direct current voltage, said first and second electrode means being located spaced from each other in the area occupied by said gaseous medium to be sterilized and cleaned, one of said electrode means including spray means comprising a plurality of nozzles for dispersing said liquid into said medium in atomized form so as to constitute a fine dispersion of minute droplets, said one electrode means including a tubular member having an inner tube and an outer tube telescopically movable with respect to each other, said tubular member being supported at one end by said housing means and carrying said spray means near its other end; supply means for supplying said liquid to said spray means; and pressure means for placing said liquid under pressure while it is supplied to said spray means said pressure means being at least partly arranged in said housing means and communicating with said tubular member for carrying compressed air to said spray means, so that said liquid is sprayed into said gaseous medium as a fine dispersion of minute droplets, the latter being charged electrostatically so as to attract suspended particles, to cause them to settle down toward the second electrode means and simultaneously to disinfect said particles, whereby microorganisms adhering to said particles are rendered ineffective.

9. Apparatus for introducing into a gaseous medium to be sterilized and cleaned an at least partly disinfectant liquid in the form of a fine dispersion of electrostatically charged droplets, comprising, in combination, source means for furnishing a high direct current voltage and including means for arbitrarily reversing the polarities of said voltage at the output terminals of said source means; housing means surrounding at least part of said source means; a first and a second electrode means connected with said source means for carrying potentials of opposite polarities corresponding to said high direct current voltage, said first and second electrode means being located spaced from each other in the area occupied by said gaseous medium to be sterilized and cleaned, one of said electrode means including spray means for dispersing said liquid into said medium in atomized form so as to constitute a fine dispersion of minute droplets, said one electrode means including a tubular member having an inner tube and an outer tube telescopically movable with respect to each other, said tubular member being supported at one end by said housing means and carrying said spray means near its other end; supply means for supplying said liquid to said spray means; and pressure means for placing said liquid under pressure while it is supplied to said spray means said pressure means being at least partly arranged in said housing means and communicating with said tubular member for carrying compressed air to said spray means, so that said liquid is sprayed into said gaseous medium as a fine dispersion of minute droplets, the latter being charged electrostatically so as to attract suspended particles, to cause them to settle down toward the second electrode means and simultaneously to disinfect said particles, whereby microorganisms adhering to said particles are rendered ineffective.

References Cited

UNITED STATES PATENTS

| 1,928,963 | 10/1933 | Chaffee | 55—107 |
| 2,150,263 | 3/1939 | Chesney | 21—53 |
| 2,207,576 | 7/1940 | Brown | 55—10 |
| 2,525,347 | 10/1950 | Gilman | 55—10 |
| 2,536,178 | 1/1951 | Weber | 239—3 |

FOREIGN PATENTS 368,118   3/1932   Great Britain.

MICHAEL E. ROGERS, *Primary Examiner.*